(12) United States Patent
Shiohara (10) Patent No.: US 7,693,415 B2
(45) Date of Patent: Apr. 6, 2010

(54) CAMERA WITH ELECTRONIC FINDER, IMAGE DISPLAY METHOD, AND CORRESPONDING PROGRAM

(75) Inventor: Ryuichi Shiohara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 385 days.

(21) Appl. No.: 11/731,591

(22) Filed: Mar. 29, 2007

(65) Prior Publication Data

US 2007/0230945 A1    Oct. 4, 2007

(30) Foreign Application Priority Data

Mar. 29, 2006    (JP)    ............................. 2006-091523

(51) Int. Cl.
*G03B 13/14*    (2006.01)
(52) U.S. Cl. .................................................... 396/377
(58) Field of Classification Search ................ 396/128, 396/374, 377, 378, 140, 324; 348/64, 333.01–333.03
See application file for complete search history.

(56) References Cited

U.S. PATENT DOCUMENTS

| 4,978,983 | A * | 12/1990 | Stålfors ........................ 396/89 |
| 2001/0040622 | A1 * | 11/2001 | Maruyama .................... 348/64 |
| 2003/0235410 | A1 * | 12/2003 | Kurosawa .................... 396/109 |
| 2006/0140507 | A1 * | 6/2006 | Ohki ........................... 382/276 |
| 2006/0249679 | A1 * | 11/2006 | Johnson et al. ............. 250/332 |

FOREIGN PATENT DOCUMENTS

| JP | 02-014675 | 1/1990 |
| JP | 2001-053992 | 2/2001 |

* cited by examiner

*Primary Examiner*—Melissa J Koval
*Assistant Examiner*—Autumn Parker
(74) *Attorney, Agent, or Firm*—Nutter McClennen & Fish LLP; John J. Penny, Jr.

(57) ABSTRACT

A main electronic imaging device takes in as a taken-image an image of a subject obtained through an imaging lens. An electronic finder device photoelectrically first generates the image of the subject and generates an image signal. Based on the generated image signal, the electronic finder device places the imaging range PA substantially at the center, generates an image of finder range FA that is one size larger than the imaging range PA, and provides the image of finder range FA that is generated with an imaging frame 47a that expresses the outer border of the imaging range so as to obtain the image as a finder image, and controls so that the finder image is displayed on a display 47. As a result, the imaging range PA is smaller than the finder range FA but is smaller by only one size. The ratio occupied by the imaging range PA within the finder range FA is accordingly sufficiently large, and the imaging range PA can be recognized easily and without fail.

6 Claims, 7 Drawing Sheets

CAMERA WITH ELECTRONIC FINDER, IMAGE DISPLAY METHOD, AND CORRESPONDING PROGRAM

DESCRIPTION OF THE PRIOR ART

1. Field of the Invention

The invention relates to a camera with an electronic finder, an image display method, and its program.

2. Description of the Related Art

Hitherto has been known a camera comprising a silver-salt photographic device for printing the image of a subject on to a silver-salt film, and an electronic finder device for imaging, by means of an image sensor, a range including a photographic range by an optical system that is different from the silver-salt photographic device, and for displaying on a monitor the image that has been taken. In this kind of camera, as disclosed, for example, in JP-A No. 2001-53992 (FIG. 4, FIG. 5), an imaging frame expressing an outer border of an imaging range is fitted to a finder image taken at an angle of view that is of the shortest focal length of the imaging lens (on the wide angle side) and is displayed on a monitor, and if parallax occurs at a time of close distance imaging, the imaging frame is shifted to the extent of the portion of the parallax, and displayed on a monitor.

SUMMARY OF THE INVENTION

However, in the finder image with the imaging frame described above, the imaging frame is smaller than the finder image, and whenever there has been any instance of interest in a portion outside the imaging frame in the finder image, it is desirable that such an instance can be captured promptly. However, the imaging frame may on occasion be considerably smaller than the finder image, and in such circumstances it has proved difficult to recognize the imaging range. Besides, since the imaging frame is displayed in a state of deviation from the center of the finder image, a user may feel a sense of unease.

The present invention has been made in consideration of the above described drawbacks. An object of the present invention is to provide a camera with an electronic finder, an image display method, and a corresponding program that enable a user to easily and adequately recognize an imaging range visually without feeling a sense of unease when viewing the imaging range.

In order to achieve at least part of the above object, the present invention is constructed as follows.

The present invention provides a camera with an electronic finder including: an image acquisition module that takes in an image of a subject obtained through an optical system to prepare a taken-image; an image display unit that displays a finder image; a first signal generation module that generates a first image signal by photoelectrically converting the image of the subject; and an image display control module that generates a finder-ranging image corresponding to a finder range which is larger than an imaging range corresponding to the taken-image and includes the imaging range substantially at the center, based on the first image signal generated by the first signal generation module, provides the finder-ranging image with an imaging frame expressing the outer border of the imaging range to generate a finder image, and controls the image display unit to display the generated finder image.

In this camera with an electronic finder of the invention, an image of a subject obtained through an optical system is taken in as a taken-image. The image of the subject is photoelectrically converted, and an image signal is generated. Based on this image signal, the finder-ranging image is generated, where the finder range includes the imaging range substantially at the center of the finder range is one size larger than the imaging range. The finder-ranging image is provided with an imaging frame that expresses the outer border of the imaging range to prepare the finder image, and the prepared finder image is displayed on the image display. The imaging range is smaller than the finder range, but is still only one size smaller, and occupies a sufficient large range in the finder range. Therefore, a user can easily recognize the imaging range visually. Since the imaging range is always located substantially at the center of the finder range, a user does not feel a sense of unease when viewing the imaging range.

In the camera with an electronic finder of the invention, the image acquisition module may include: a second signal generation module that generates a second image signal by photoelectrically converting the image of the subject; and a taken-image generation module that generates the taken-image based on the generated second image signal generated by the second signal generation module. In this arrangement, the image signal used for the taken-image and the image signal used for the electronic finder are generated by different devices. Thus, the speed of imaging can be accelerated.

In the camera with an electronic finder of the above arrangement, the first signal generation module may have less photoelectric converting elements for photoelectrically converting the image of the subject than the second signal generation module. In this way, the quality of the taken-image can be enhanced while reducing the cost of providing an electronic finder function.

The image acquisition module may prepare a taken-image based on the image signal obtained by photoelectric conversion of the image of the subject, and may otherwise prepare a taken-image by copying the image of the subject on a silver-salt film.

In the camera with an electronic finder of the invention, the image display control module may correct parallax between the taken-image and the imaging frame, based on a degree of user's rotation of a distance ring attached to an imaging lens, so as to generate the finder image. In this way, an image in the imaging frame coincides with the taken-image, and a user can recognize the imaging range more adequately. In addition, the imaging frame after the correction of parallax is placed substantially at the center of the finder image, and a user can view the imaging range without feeling a sense of unease.

The camera with an electronic finder of the invention may further include a distance detection module that detects a distance to the subject, and the image display control module may correct parallax between the taken-image and the imaging frame, based on the distance to the subject detected by the distance detection module. In this way, too, an image in the imaging frame coincides with the taken-image, and a user can recognize the imaging range more adequately. In addition, the imaging frame after the correction of parallax is placed substantially at the center of the finder image, and a user can view the imaging range without feeling a sense of unease.

In the camera with an electronic finder of the invention, the finder range may be determined so that the imaging range occupies 30 to 80%, preferably 40 to 65% of the finder range. In this way, the imaging range occupies the finder range at a high ratio, a user can recognize the imaging range more easily and adequately.

The present invention also provides an image display method for displaying a finder image on an image display unit, including the steps of: (a) taking in an image of a subject obtained through an optical system to prepare a taken-image; (b) generating an image signal by photoelectrically converting the image of the subject; and (c) generating a finder-ranging image corresponding to a finder range which is larger than an imaging range corresponding to the taken-image and includes the imaging range substantially at the center, based on the image signal generated by the step (b), providing the finder-ranging image with an imaging frame expressing the outer border of the imaging range to generate a finder image, and controlling the image display unit to display the generated finder image.

In this image display method of the invention, an image of a subject obtained through an optical system is taken in as a taken-image. The image of the subject is photoelectrically converted, and an image signal is generated. Based on this image signal, the finder-ranging image is generated, where the finder range includes the imaging range substantially at the center of the finder range is one size larger than the imaging range. The finder-ranging image is provided with an imaging frame that expresses the outer border of the imaging range to prepare the finder image, and the prepared finder image is displayed on the image display. The imaging range is smaller than the finder range, but is still only one size smaller, and occupies a sufficient large range in the finder range. Therefore, a user can easily recognize the imaging range visually. Since the imaging range is always located substantially at the center of the finder range, a user does not feel a sense of unease when viewing the imaging range. The image display method of the invention may further include a step that realizes any additional function of the camera with the electronic finder of the invention described above.

The present invention further provides a program that causes one or multiple computers to execute respective steps of the image display method of the invention described above. This program may be recorded in a computer-readable recording medium (e.g., a flash ROM, a ROM, a hard disc, a FD, a CD, a DVD), may be delivered from one computer to another via a transmission medium (a communication network such as the Internet, and a LAN) and recorded in a RAM, or may be given or received in any other form. By causing one computer to execute the program or causing multiple computers to execute the respective steps of the program, similar effects to those of the image display method are achieved.

BEST MODE FOR CARRYING OUT THE INVENTION

Figure 1:
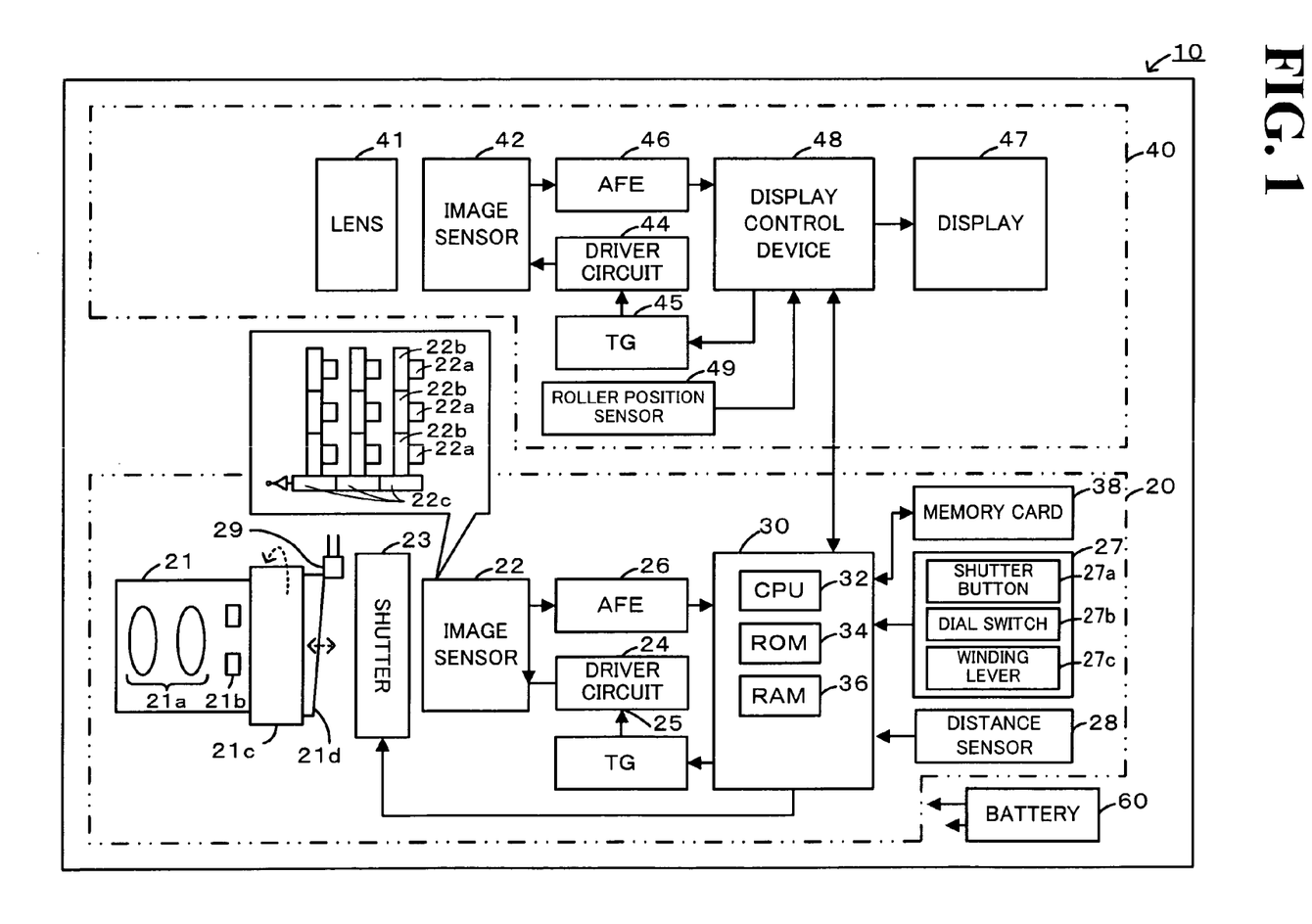
FIG. 1 is a block diagram of a digital camera 10 in one embodiment of the invention.
Figure 2:
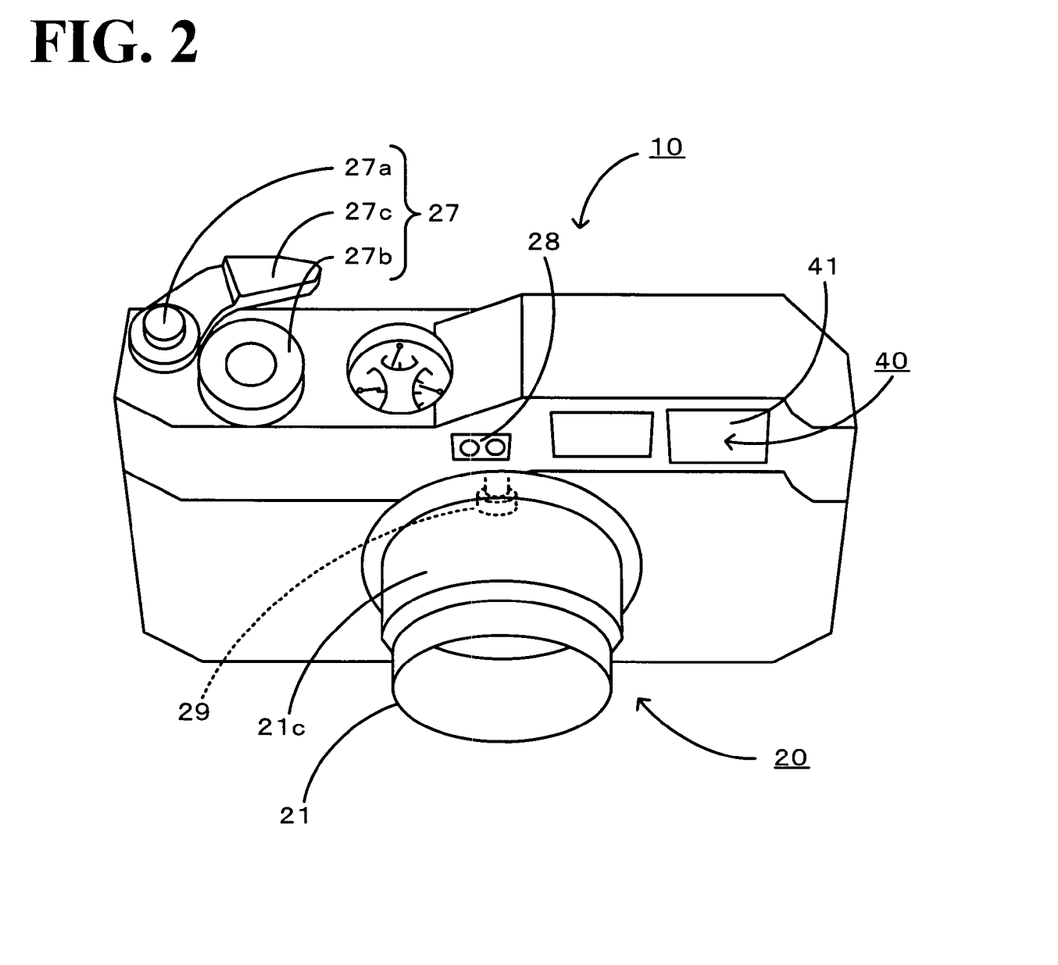
FIG. 2 is a perspective view of the digital camera 10.
Figure 3:
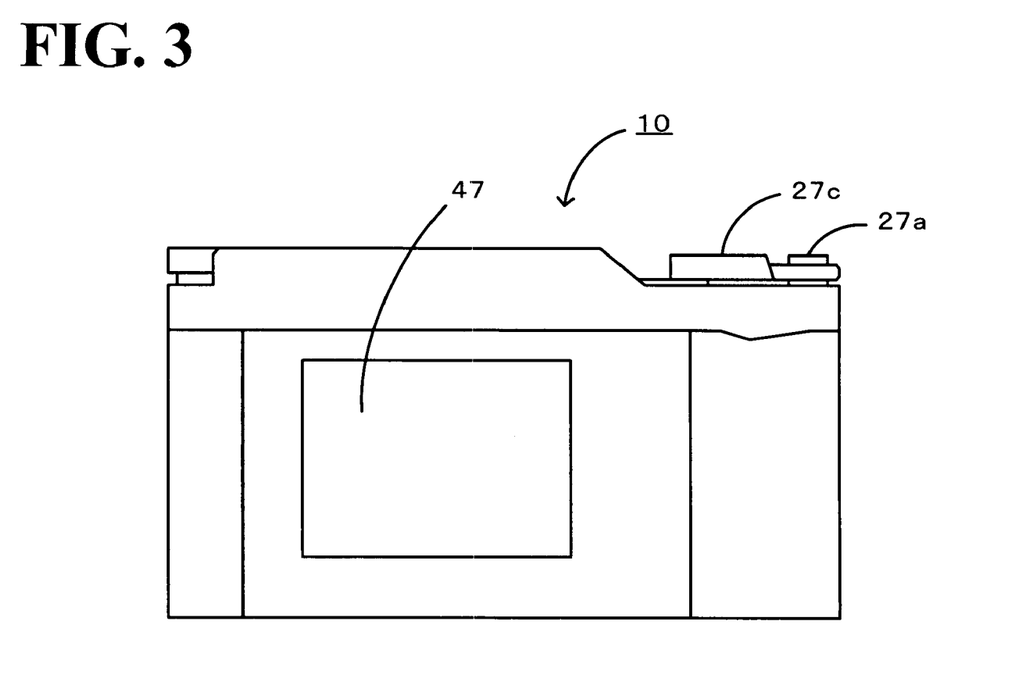
FIG. 3 is a rear view of the digital camera 10.

A preferred embodiment of the invention is specifically described below with reference to the accompanying drawings. FIG. 1 is a block diagram of a digital camera 10 in an embodiment of the invention, FIG. 2 is a perspective view of the digital camera 10, and FIG. 3 is a rear view of the digital camera 10.

The digital camera 10 of the embodiment comprises, as shown in FIG. 1, a main electronic imaging device 20 for photoelectrically converting the image of a subject to generate an image signal, and for generating, based on the generated image signal, an image taken (a taken-image); an electronic finder device 40 installed separately from the main electronic imaging device 20 for generating a finder image based on an image signal generated by photoelectrically converting the subject, and for controlling the display of the finder image on a display 47; and a rechargeable battery 60.

The main electronic imaging device 20 includes an exchangeable imaging lens 21, an image sensor 22 for converting light into an electric signal by photoelectric conversion; a focal plane shutter 23 disposed between the imaging lens 21 and the image sensor 22; a timing generator (TG) 25 for issuing to the image sensor 22 by way of a driver circuit 24 the timings for starting various operations of the image sensor 22; an analog front end (AFE) 26 for converting an electric signal issued from the image sensor 22 into a digital signal; various operation switches 27 to be manipulated by the user; a distance sensor 28 for detecting a distance to the subject, and a main control device 30 for executing various controls.

The imaging lens 21 is detachably mounted by way of an unillustrated lens mount, and includes a lens group 21a as a combination of a convex lens and a concave lens for suppressing aberration, and a diaphragm mechanism 21b for regulating the quantity of light. The imaging lens 21 also includes a distance ring 21c, the focal length of which can be varied by means of rotational motion performed by a user, and a propelling portion 21d provided at the inner end of the imaging lens 21 for varying the extent of propulsion in accordance with the degree of rotation of the distance ring 21c. The diaphragm mechanism 21b may also be disposed in the group structure of the lens group 21a.

The image sensor 22 includes a plurality of photo diodes 22a disposed in a matrix; a CCD 22b for vertical transfer that is capable of transferring the electric charge received from the photo diodes 22a formed in each photo diode 22a in a vertical direction, and a CCD 22c for horizontal transfer that is capable of transferring in a horizontal direction an electric charge that has been received from the CCD 22b for vertical transfer positioned at the terminal end in a vertical direction. The photodiode 22a is a photoelectric converting element provided in each pixel, and is designed to convert light that has been exposed into an electric charge, and to accumulate the electric charge. The photo diode 22a has an electronic shutter function, and this electronic shutter function enables the electric charge to be released to an unillustrated substrate. The CCD 22b for vertical transfer and the CCD 22c for horizontal transfer are electric charge transfer elements, and do not operate during exposure. However, at a time immediately before exposure, or at a time before electric charge is received from the photo diode 22a after exposure, the CCD 22b and CCD 22c sweep out any unnecessary electric charge that has been collected in the CCD 22b and CCD 22c and become noise. Moreover, electric charge after exposure is received from the photo diode 22a and transferred sequentially, so that an image signal can be read out. The photo diodes 22a, CCD 22b for vertical transfer, and CCD 22c for horizontal transfer are driven by the driver circuit 24. As the image sensor 22, herein, the CCD image sensor is shown, but a CMOS (Complementary Metal Oxide Semiconductor) type image sensor may be also used.

The focal plane shutter 23 opens and closes the shutter by operating a shutter blind composed of a front blind and a rear blind. In this focal plane shutter 23, when focus is put on at one point in the image sensor 22, the time between the start of exposure as the rear end of the front blind passes this one point, and the time that the light is shielded as the leading end of the rear blind passes the same point, corresponds to the shutter speed.

The TG 25 provides the driver circuit 24 with output timing of the vertical line shift pulse for determining the driving speed of the CCD 22b for vertical transfer, or of the horizontal line shift pulse for determining the driving speed of the CCD 22c for horizontal transfer, or output timing of a synchronous signal for synchronizing the operations of various devices.

The AFE 26 is a circuit that reproduces an optical black signal from an image analog signal read out from the photo diode 22a in the image sensor 22, reads the signal by suppressing noise by way of a correlation double sampler (CDS) processing circuit, converts the signal into a digital signal of about 10 to 14 bits by way of a variable amplifier for amplifying to an appropriate signal level, and outputs the digital signal. The digital signal outputted from this AFE 26 is subject to image processing of a widely known type in the digital camera, such as a color interpolation process, a white balance process, a color reproduction process, or a gamma correction process, of RGB elements in an unillustrated image processing function block in the display control device 48, and is then compressed and stored in a memory card 38 as a JPEG file.

Operation switches 27 include a shutter button 27a for issuing timings for incorporating images focused on the image sensor 22 through the imaging lens 21 to the main control device 30 in response to a user's push operation; a dial switch 27b for setting the shutter speed or exposure; and a winding lever 27c for lifting and mechanically fixing the shutter blind of the focal plane shutter 23 from a shutter-released state to a ready-state for the next shutter operation, in response to a user's winding up operation.

The distance sensor 28 in the embodiment is composed of an infrared sensor for measuring the distance approximately, and a phase difference sensor for measuring the distance accurately. The infrared sensor is composed of a light-emitting diode for emitting an infrared ray toward the subject, and a photo detector for receiving a reflected light of an infrared ray from the subject, and issues a distance signal that expresses the distance to the subject according to the incident angle to the photo detector. The phase difference sensor is composed of two sets of lenses that are disposed at a specific distance, and an area sensor disposed behind each of the lenses, the incident image from the subject is focused on each area sensor, and the distance is measured according to a trigonometric principle based on the phase difference of the position in the area sensor of each image. Herein, the infrared sensor is used in close distance (less than a predetermined threshold), and the phase difference sensor is used at a long distance (more than a predetermined threshold).

The main control device 30 is a microprocessor mainly comprising a CPU 32, and includes a ROM 34 for storing processing programs and tables, a RAM 36 for temporarily storing data, and unillustrated input and output ports and a communication port. The main control device 30 receives various switch signals to the operation switches 27, digital signals from the AFE 26, and various data that are read out from the memory card 38. The main control device 30 issues various signals, such as a shutter drive signal from the focal plane shutter 23, a control signal to the TG 25, and an image request signal to the memory card 38. The main control device 30 also exchanges data with the display control device 48 of the electronic finder device 40.

The electronic finder device 40 includes a lens 41, an image sensor 42 for converting light into an electric signal by photoelectric conversion; a TG 45 for issuing start timing of various operations of the image sensor 42 to the image sensor 42 by way of a driver circuit 44; an AFE 46 for converting the electric signal issued from the image sensor 42 into a digital signal; a display 47 for displaying a finder image; a roller position sensor 49 for detecting the operation of the distance meter interlocked roller 29 that moves mechanically in conformance with the extent of propulsion by the propelling portion 21d of the imaging lens 21 and issuing information relating to the distance of the imaging lens 21 based on the detected result; and a display control device 48 for issuing a control signal to the TG 45, for receiving distance information from the roller position sensor 49, for converting, based on this distance information, the digital signal issued from the AFE 46 into an image display signal, and for displaying the image on the display 47 as a finder image. The display control device 48 has, although it is not illustrated, an image processing function block for executing an imaging process of a well-known type in the digital camera, such as a color interpolation process, a white balance process, a color reproduction process, or a gamma correction process of the RGB elements. The image sensor 42, the driver circuit 44, and the TG 45 are similar to the image sensor 22, the driver circuit 24, and the TG 25, and a description thereof has accordingly been omitted. However, the image sensor 22 has millions, or tens of millions, of pixels, while the image sensor 42 has only hundreds of thousands, or millions, of pixels, and in comparison with the image sensor 22, the image sensor 42 is far smaller in terms of the number of pixels and hence is very inexpensive.

A battery 60 is a secondary battery such as a rechargeable lithium hydrogen battery or a nickel hydrogen battery. An unillustrated power supply unit is connected to the battery 60, and a voltage converted to an appropriate level by the power supply unit is supplied to various circuits and devices.

Figure 4:
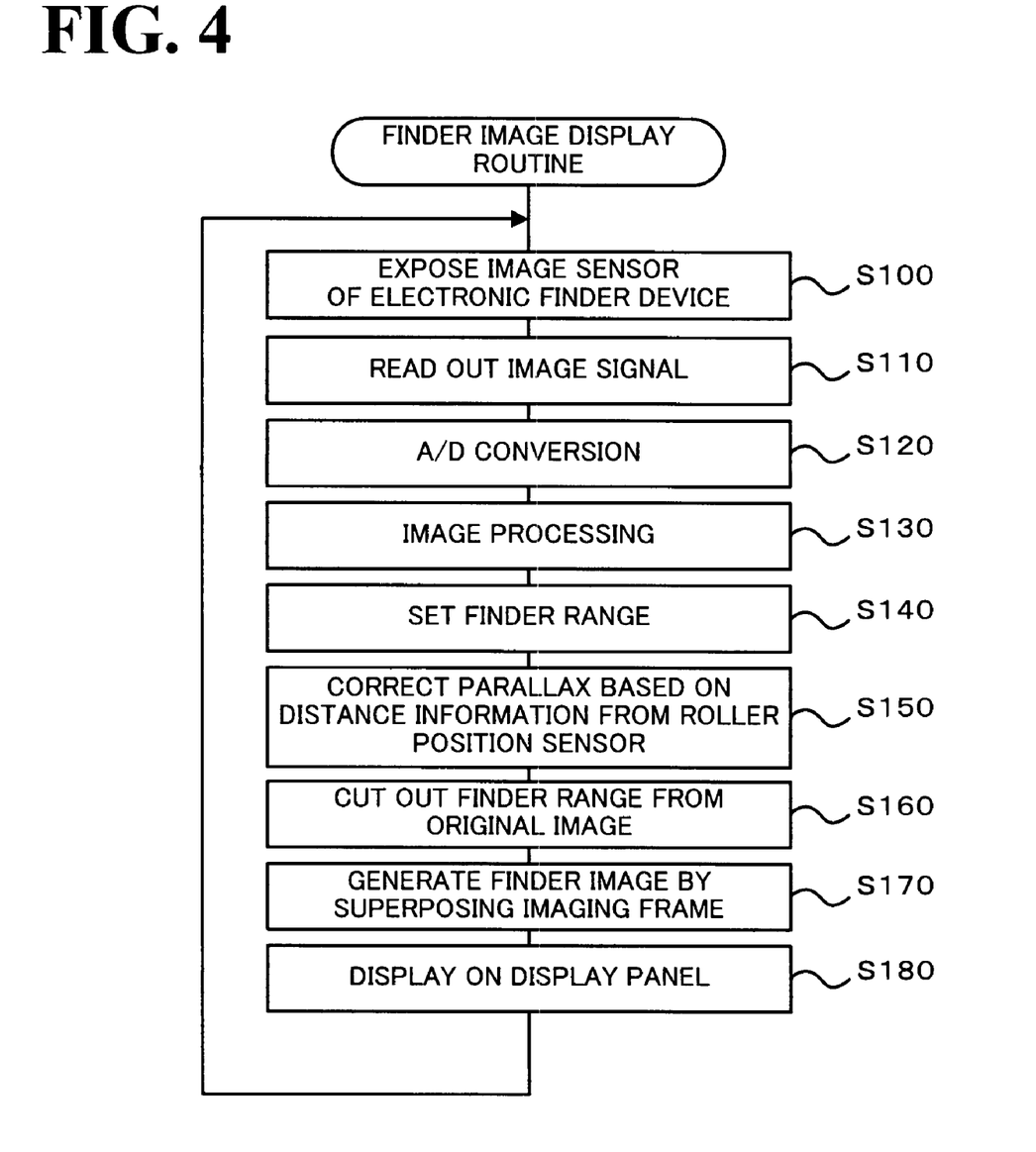
FIG. 4 is a flowchart of a finder image display routine.
Figure 5:
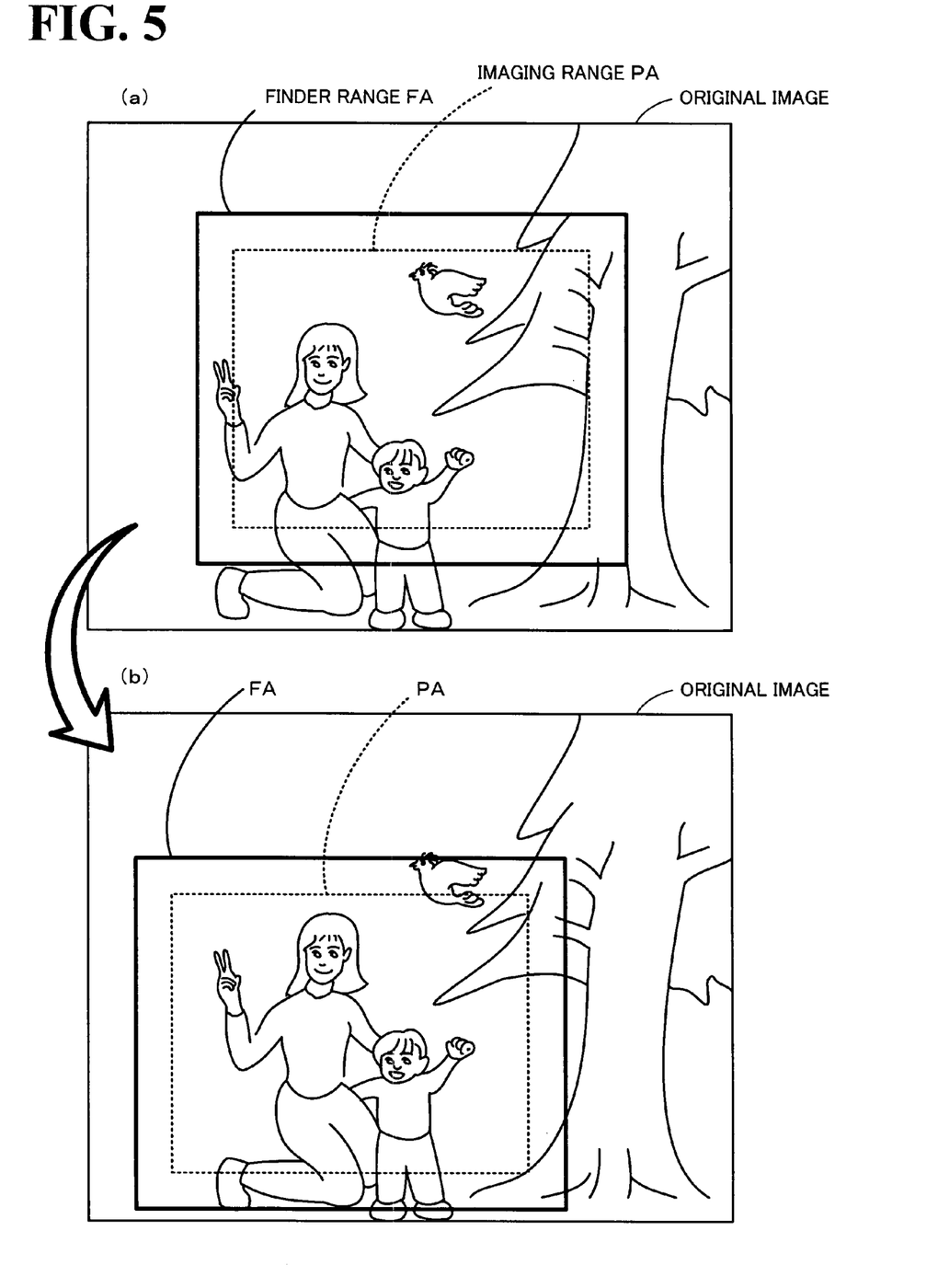
FIG. 5 is an explanatory diagram illustrating an example of image processing.

Operation of the digital camera 10 of the embodiment thus composed will now be explained. FIG. 4 is a flowchart of a finder image display routine executed by the display control device 48. This routine is executed during a period after an unillustrated power switch has been turned ON and extending until it is turned OFF. When this routine starts, the display control device 48 first exposes the image sensor 42 of the electronic finder device 40 (step S100), reads out an image signal from the image sensor 42 (step S110), and converts the image signal into a digital signal (S120). These operations are executed by the TG 45, the driver circuit 44, and the AFE 46. Next, the display control device 48 executes image processing steps of a well-known type such as a pixel interpolation process to generate an original image (step S130). FIG. 5 is an explanatory diagram illustrating an example of image processing. Next, based on the focal length of the imaging lens 21, the display control device 48 sets a finder range FA which is one size larger than the imaging range PA that corresponds to the range of an image that has been taken and obtained by an image signal from the image sensor 22 (step S140). The finder range FA sets the imaging range PA (30 to 80%, preferably 40 to 65% of finder range FA) substantially at the center of the finder range FA. This finder range FA is also used as a cutting frame for cutting out the finder image from the original image, and its size is determined in accordance with the focal length of the imaging lens 21. The focal length of the imaging lens 21 is set at any one of 28 mm, 35 mm, and 50 mm, by means of unillustrated lens setting switch. Subsequently, the display control device 48 corrects the parallax of the finder range FA, based on the distance information obtained from the roller position sensor 49 (step S150). The distance information obtained from the roller position sensor 49 is regarded as normally expressing the distance to the subject. In this context, since the position of the image sensor 22 of the main electronic imaging device 20 that faces the subject, and the position of the image sensor 42 of the electronic finder device 40 that faces the subject are distant from each other by an extent of several centimeters (see FIG. 2), the shorter the distance to the subject, the larger becomes the deviation (parallax) between the image obtained from the image sensor 22 and the image obtained from the image sensor 42. In this embodiment, the position of the finder range FA on the original image is corrected so as to eliminate the parallax. Specifically, the shorter the distance is to the subject, the greater the extent is to which the finder range FA is moved in the direction of the imaging lens 21. FIG. 5(a) illustrates a state before correction of the parallax, and FIG. 5(b) illustrates a state after correction of the parallax.

Figure 6:
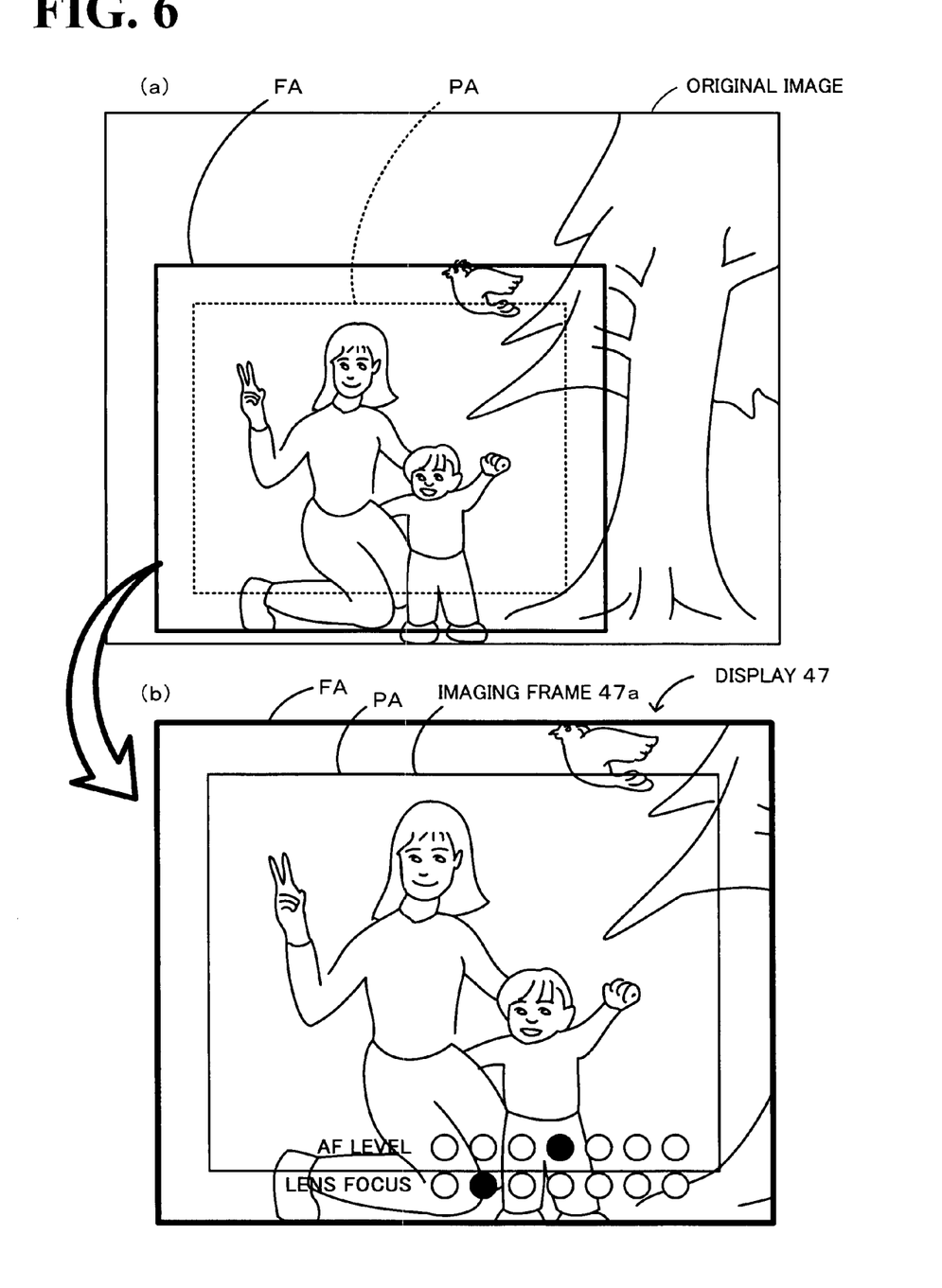
FIG. 6 is an explanatory diagram illustrating a finder image.

After correction of the parallax, the display control device 48 cuts out the finder range FA from the original image (step S160), superposes an imaging frame 47a forming an outer border of the imaging range PA on the image that has been cut, so as to generates a finder image (step S170), and displays the generated finder image on a display 47 (step S180) and returns to step S100. FIG. 6 is an explanatory diagram of an example of the finder image, FIG. 6(a) illustrates an original image before the finder range FA has been cut out, and FIG. 6(b) illustrates a finder image in which the finder range FA has been cut out and displayed on the display 47.

In the digital camera 10 of the embodiment, the focus is adjusted as follows. In the bottom of the finder image displayed on the display 47, as shown in FIG. 6(b), a level meter indicating an AF level and a level meter indicating a lens focus position are displayed, respectively at upper and lower positions. Each level meter includes a plurality of circles arranged in a horizontal row. For an AF level, a circle at a position corresponding to the distance to the subject that has been measured by the distance sensor 28 is lit up. For a lens focus position, the plurality of circles are lit up sequentially so that it looks like the light moves, as a user rotates the distance ring 21c. When the user turns the distance ring 21c, the lighted circle mark of the AF level comes immediately beneath the lighted circle mark at the focus position, and a judgment is made that the focus has been adjusted. During such a focus adjusting period, the finder image display routine can be executed.

Figure 7:
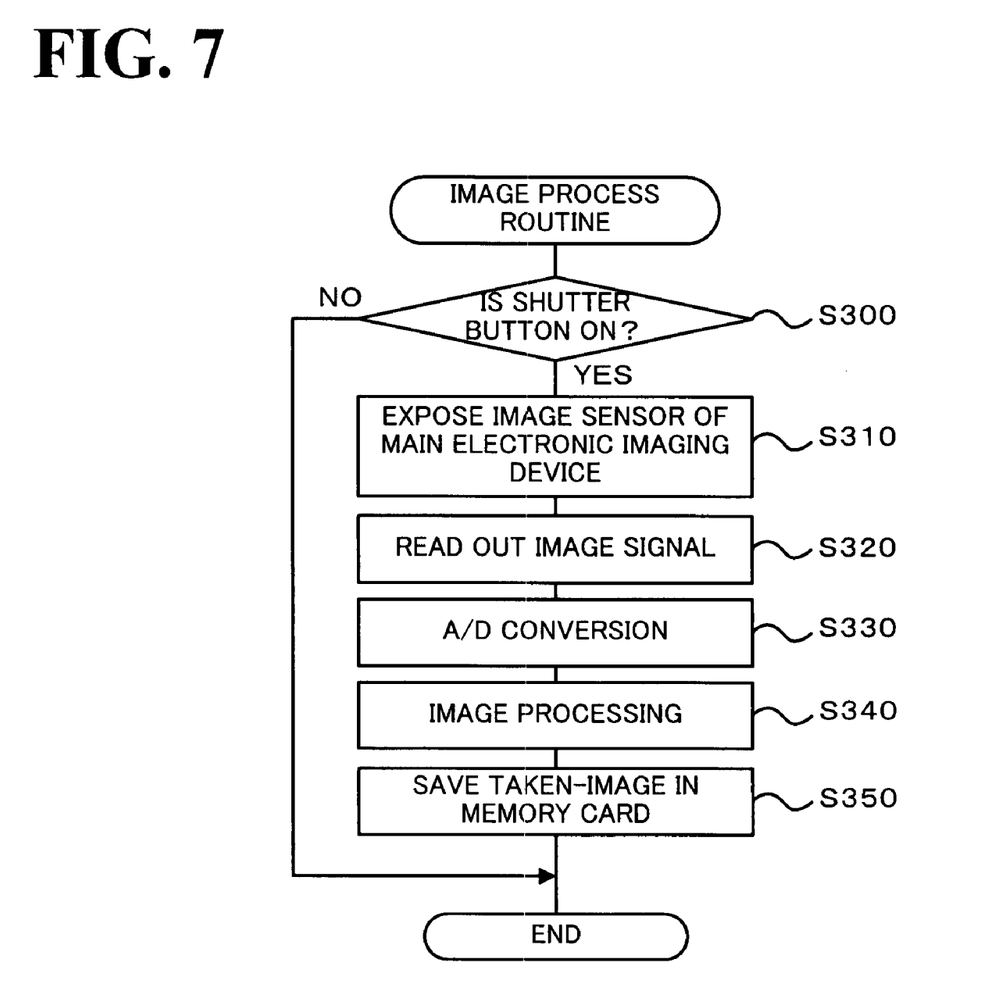
FIG. 7 is a flowchart of a image process routine.

An operation in which imaging is performed by use of the digital camera 10 will now be explained. FIG. 7 is a flowchart of the imaging process routine executed by the CPU 32 of the main control device 30. This routine is executed repeatedly at a specified timing (for example, at every several milliseconds) between the time that the unillustrated power switch is once turned on and the time that it is then turned off. When this routine has been started, the CPU 32 judges whether or not the shutter button 27a has been pressed or not (step S300). When the shutter button 27a is not pressed, the CPU 32 terminates this routine directly. When the shutter button 27a has been pressed, on the other hand, the CPU 32 controls to sweep out any unnecessary electric charge that has been collected in the image sensor 22 and that is to become noise, so as to prepare for imaging. Once preparation for imaging has been completed, the CPU 32 exposes the image sensor 22 of the main electronic imaging device 20 by the focal plane shutter 23 (step S310), reads out the image signal from the image sensor 42 (step S320), and converts the read image signal into a digital signal (step S330). These operations are executed by the TG 45, the driver circuit 44, and the AFE 46. Further, the exposure time is determined by the shutter speed set by the dial switch 27b. Next, the CPU 32 generates an image that has been taken (a taken-image), by means of well-known image processing such as a pixel interpolation process, a white balance process, or a gamma correction process, (step S340), saves the generated taken-image in the memory card 38 (step S350), and terminates this routine. Further, in this context, the shutter speed is set manually, but by determination of an appropriate extent of exposure of the subject, the shutter speed may be set automatically based on the extent of exposure determined.

The correlation of components of the embodiment with constituent elements of the invention will now be clarified. The main electronic imaging device 20 of the embodiment corresponds to the device for acquiring images taken of the invention, the display 47 to the image display device, the image sensor 42 to the first signal generating device, and the display control device 48 to the image display control device. The image sensor 22 corresponds to the second signal generating device, the main control device 30 to the device of generating images taken, and the distance sensor 28 to the distance detecting device. In the embodiment, by explaining an operation of the digital camera 10, an example of the image display method of the invention will also be clarified.

According to the digital camera 10 of the embodiment described herein, the imaging range PA is smaller than the finder range FA, but smaller by only one size, and hence the ratio of the finding range FA occupied by the imaging range PA is sufficiently large. Therefore, a user can visually recognize the imaging range PA easily and without fail. Furthermore, since the imaging range PA is always located substantially at the center of the finder range FA, when viewing the imaging range PA, a user does not feel a sense of unease. Further, since the finder range FA is larger than the imaging range PA, in the eventuality of any instance of interest in a portion that slightly exceeds the imaging range PA, such an instance can be captured quickly. In other words, as and when required, the circumstances surrounding the subject can be seen in the non-imaging range surrounding the range to be imaged, and this merit is extremely effective in coping with unexpected changes in the environment of the subject when imaging, or for purposes of confirming setting of the imaging framework.

In addition, since the image signal used in an image taken and an image signal used in the finder image are generated by separate image sensors 22, 42, imaging speed is enhanced in comparison with circumstances where both image sensors are generated by a common image sensor. For example, if both signals are generated by a common image sensor, after an image signal is used in the finder image, and the electric charge of this image sensor is swept out, and then the image signal for use in an image taken is acquired anew. All this takes time, but if both image signals are generated in different image sensors 22, 42, such a complicated operation is not required, and the imaging speed is enhanced.

Moreover, an image sensor 42 used in a finder image is smaller in terms of the number of pixels than an image sensor 22 used in an image taken (that is, smaller in terms of the number of photoelectric converting elements). Hence the pictorial quality of an image taken is improved, a relatively inexpensive electronic finder function can be mounted, an image can be read at a high speed, and it is possible to control the shutter lag time, which is a most important factor in the imaging of a subject. For example, a VGA pixel size (about 300,000 pixels) can be read at a speed of 36 MHz, and more than 100 moving pictures can be read out per second (more than 100 fps). Furthermore, while the image is being processed by pipeline, when displayed at 60 fps on the display 47, a delay in display of images for the viewer is about 25 to 30 msec, and when a necessary preparation time of 60 to 80 msec is added for imaging after a shutter operation, the total shutter time lag is about 60 to 80 msec. This length of time is within a practical range for an ordinary film in a single-lens reflex camera. Furthermore, by reading an image at a high speed, and by synchronizing imaging and displaying, the time lag can be shortened even further.

Since an image that has been taken and the image in the imaging frame 47a are identical, a user can recognize the imaging range without fail. And, since an imaging frame 47a following correction of the parallax is located substantially at the center of the finder range, a user will not feel a sense of unease.

The invention is not limited to the foregoing embodiment alone, but may be changed and modified in various forms within the technical scope of the invention.

In the above-described embodiment, a taken-image is generated based on an image signal obtained by means of photoelectric conversion of the image of the subject performed by the main electronic imaging device 20. The main electronic imaging device 20 may be replaced by a silver-salt imaging device for generating a taken-image by copying the image of the subject on a silver-salt film. In this case, too, a user can easily recognize the imaging range PA without fail. Moreover, since the imaging range PA is always located substantially at the center of the finder range FA, when viewing the imaging range PA, a user will not feel a sense of unease. Further, since the finder range FA is larger than the imaging range PA, if an instance occurs of interest in a portion that exceeds slightly the imaging range PA, such an instance can be quickly captured.

In the above-described embodiment, parallax occurring between an image taken and the imaging range PA is corrected based on the degree of rotation of the distance ring 21c. In one structure, parallax occurring between the taken image and imaging range PA may be corrected based on the distance to the subject detected by the distance sensor 28. In such circumstances, too, since the image taken and the image in the imaging frame 47a are identical, a user can recognize the imaging range without fail, and since the imaging frame 47a after correction of the parallax is located substantially at the center of the finder image, a user will not feel a sense of unease.

In the above-described embodiment, when an automatic white balance is executed, the white balance may be executed in advance by using the image sensor 42 of the electronic finder device 40. In the embodiment, when the imaging lens 21 has a zoom function, the finder image of the electronic finder device 40 can be zoomed digitally in an interlocking manner with the zoom operation.

In the above-described embodiment, the focal distance of the imaging lens 21 is set at any one of 28 mm, 35 mm, and 50 mm by means of unillustrated lens setting switch, but four or more choices of focal length may be provided by the lens setting switch, or the focal length may be entered by a user as a numerical value. The zoom factor information determined by the zoom lens may be incorporated into the camera by an electric communication device, and the optical zoom or digital zoom of the finder may be controlled in conformity with the zoom setting of the imaging zoom lens.

The present application claims priority to Japanese patent application no. 2006-091523 filed on Mar. 29, 2006, the entire contents of which are incorporated herein by reference.

What is claimed is:

1. A camera comprising:
   a first image acquisition module that acquires and stores an image of a subject as a first image;
   a second image acquisition module that acquires and stores an image of the subject using an image sensor as a second image;
   a parallax acquisition module that acquires a degree of parallax between the first image and the second image; and
   an image display unit that displays a display image in which an imaging frame is settled substantially in the center, the imaging frame corresponding to a range of the first image and being provided at a position based on the degree of parallax in the second image.

2. The camera of claim 1, wherein the parallax acquisition module acquires a degree of a user's rotation of a distance ring attached to an imaging lens as the degree of parallax, and wherein the imaging frame is provided at a position based on the degree of rotation.

3. The camera of claim 1, wherein the parallax acquisition module detects and acquires a distance to the subject as the degree of parallax, and wherein the imaging frame is provided at a position based on the distance to the subject.

4. A method for displaying a display image on an image display unit, comprising the steps of:
   (a) acquiring and storing an image of a subject as a first image;
   (b) acquiring and storing an image of the subject using an image sensor as a second image;
   (c) acquiring a degree of parallax between the first image and the second image;
   (d) displaying a display image in which an imaging frame is put substantially in the center, the imaging frame corresponding to a range of the first image and being provided at a position based on the degree of parallax in the second image.

5. The method of claim 4, wherein step (c) includes acquiring a degree of a user's rotation of a distance ring attached to an imaging lens as the degree of parallax and step (d) includes displaying a display image in which the imaging frame is provided at a position based on the degree of rotation.

6. The method of claim 4, wherein step (c) includes detecting and acquiring a distance to the subject as the degree of parallax, and step (d) includes displaying a display image in which the imaging frame is provided at a position based on the distance to the subject.

* * * * *